United States Patent [19]
Edwards

[11] Patent Number: 5,247,322
[45] Date of Patent: Sep. 21, 1993

[54] DUAL FILM SINGLE LENS REFLEX CAMERA

[76] Inventor: Lindsay M. Edwards, No. 603, Kuriki Daini Building Suwano Machi, 2378-32 Kurume-shi, Fukuoka, 830, Japan

[21] Appl. No.: 791,557
[22] Filed: Nov. 14, 1991
[51] Int. Cl.⁵ ............................................. G03B 19/12
[52] U.S. Cl. .................................... 354/152; 354/154
[58] Field of Search ........................ 354/152, 154, 210

[56] References Cited

U.S. PATENT DOCUMENTS

| | | | |
|---|---|---|---|
| 2,988,923 | 6/1961 | Böhm | 354/210 |
| 3,058,407 | 10/1962 | Schotthoefer | 354/210 |
| 3,256,794 | 6/1966 | Schutt et al. | 354/210 |
| 3,286,613 | 11/1966 | Domnick | 354/210 |
| 3,805,277 | 4/1974 | Domnick | 354/21 |
| 4,124,856 | 11/1978 | Tarr | 354/86 |
| 4,126,875 | 11/1978 | Wareham | 354/86 |
| 5,049,910 | 9/1991 | Hsiung | 354/210 |

Primary Examiner—Michael L. Gellner
Assistant Examiner—Nicholas J. Tuccillo
Attorney, Agent, or Firm—Don J. Flickinger; Jordan M. Meschkow; Robert A. Parsons

[57] ABSTRACT

A camera housing having a photographic lens set extending through one side allowing light to enter a camera interior along a light axis, a first film structure, a second film structure and a viewfinder system formed in the remaining sides of the camera housing. A first shutter mechanism separating a first film structure from the camera interior and a second shutter mechanism separating the second film structure from the camera interior. A reflex mirror structure located in the camera interior and coupled to the camera housing, directing the light axis between first and second shutter mechanisms and the viewfinder system in response to the activation of the first and second shutter mechanisms.

2 Claims, 3 Drawing Sheets

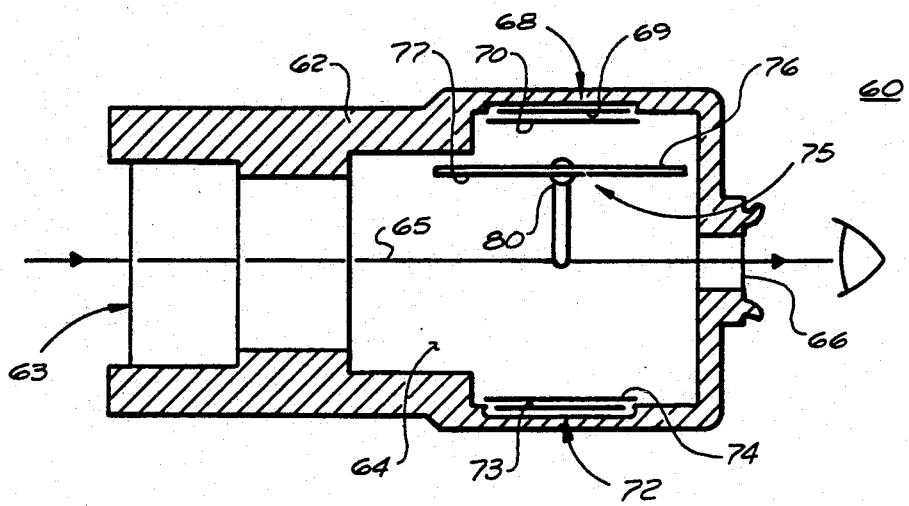
FIG. 7
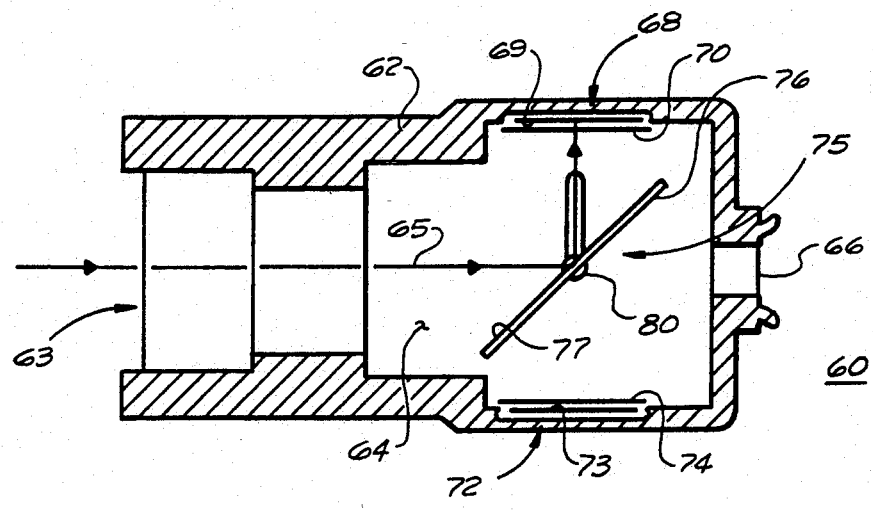
FIG. 8
FIG. 9
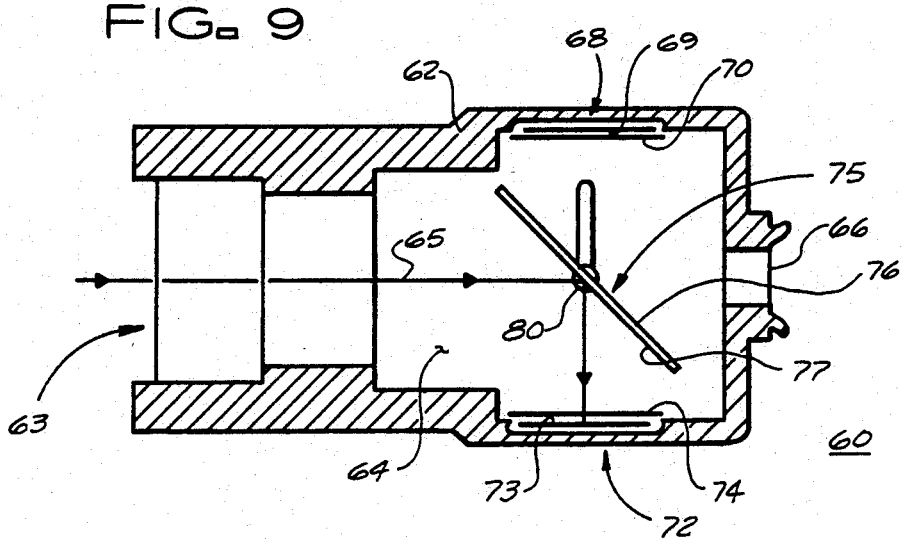

DUAL FILM SINGLE LENS REFLEX CAMERA

BACKGROUND OF THE INVENTION

1. Field of the Invention

This invention relates to single lens reflex cameras.

More particularly, the present invention relates to single lens reflex cameras which can load and expose two rolled films.

2. Prior Art

Single lens reflex cameras, that is, cameras which employ a single lens structure to focus light on film, are well-known. Single lens reflex cameras (SLR) employ a reflex mirror which focuses incoming light from the lens structure to a viewfinder. The cameras operator then focuses the image seen through the viewfinder and opens a shutter. When the shutter is opened, the reflex mirror changes position, focusing the incoming light onto the film which has been exposed by opening the shutter. The drawback with this type of camera, is that a single type of film can be used at any one time. Once a film has been installed in the camera, it cannot be removed without exposing all the film until the whole roll has been used and rewound. Therefore, in order to use a different type of film such as black and white replacing color, the entire roll of film must first be exposed before being replaced with the second roll. Also, if something should happen to the shutter mechanism of this camera, it must be repaired before it can be used again.

To overcome these problems, an SLR camera which can use two kinds of film has been developed. However, these cameras so far developed use a reflex mirror to change the light axis only between the two film rolls. It does not direct incoming light to a viewfinder. Therefore, separate lenses would be required to direct light to a viewfinder, which would induce a loss of perception do to parallax. The photographer would not be viewing and focusing on what is actually going to be photographed through the photographing lenses. Also, a single lens shutter is used to shut out unwanted light. The lens shutter is placed inside the camera, just behind the photographing lenses, in front of the mirror. Because of this shutter placement, both films always run the risk of being exposed inside the camera should the shutter mechanism, or revolving reflex mirror fail. Due to the problems of focusing and the possibility of both films being exposed, SLR's which can load two films have not been put to practical use.

It would be highly advantageous, therefore, to remedy the foregoing and other deficiencies inherent in the prior art.

Accordingly, it is an object of the present invention to provide a new and improved single lens reflex camera.

Another object of the present invention is to provide a single lens reflex camera which can accept two rolls of film.

And another object of the present invention is to provide a single lens reflex camera which can change the light axis three separate directions.

Still another object of the present invention is to provide a single lens reflex camera which can load two different rolled films and is able to expose both of these rolled films independent of each other.

Still another object of the immediate invention is to provide a single lens reflex camera which can load two rolls of film and which is protected from exposing both rolls simultaneously.

Yet another object of the present invention is to provide a single lens reflex camera which utilizes a viewfinder which focuses through photographing lenses, allowing the photographer to see and focus on what is being photographed.

A further object of the present invention is to provide a single lens camera which can still be operated with the failure of one shutter mechanism.

And a further object of the present invention is to provide a single lens reflex camera which can load two rolled films which are exchangeable independent of each other.

SUMMARY OF THE INVENTION

Briefly, to achieve the desired objects of the invention in accordance with the preferred embodiment thereof, provided is a camera housing having a single photographic lens set. At least one reflex mirror is positioned inside the camera housing, and can be positioned to deflect light coming in through the lens structure along a light axis in three separate directions. Light may be reflected from the light axis to a viewfinder coupled to the camera housing, or to two separate film rolls, each protected by a shutter mechanism. As each shutter mechanism is activated, the reflex mirror structure changes the light axis from the viewfinder to the film behind whichever shutter was activated.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 7 is a cross-sectional side view of a further embodiment of the present invention with two shutter mechanisms positioned at 180 degrees to each other, and utilizing a reflex mirror structure having one single-sided articulated mirror as it would appear positioned to allow light access to a viewfinder;

FIG. 8 is a cross-sectional side view of the embodiment illustrated in FIG. 7, as it would appear with the reflex mirror structure positioned to reflect light from the light axis onto a first shutter mechanism;

FIG. 9 is a cross-sectional side view of the embodiment of the present invention illustrated in FIG. 7, as it would appear with the reflex mirror structure positioned to reflect light from the light axis onto a second shutter mechanism.

DETAILED DESCRIPTION OF THE PREFERRED EMBODIMENT

Figure 1:
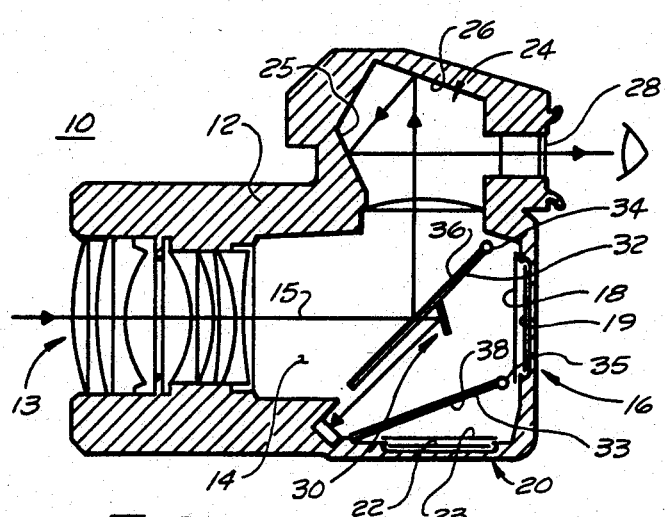
FIG. 1 is a cross-sectional side view of a first embodiment of the present invention utilizing a reflex mirror structure having two single-sided reflex mirrors, as it would appear with the reflex mirror structure positioned to reflect light from the light axis to a viewfinder.

Turning now to the drawings in which like reference characters indicate corresponding elements throughout the several views, attention is first directed to FIG. 1 which illustrates a double film single lens reflex camera generally designated 10. Camera 10 has a camera housing 12 with a photographic lens set 13 extending through one side and allowing light access to camera interior 14 along a light axis 15. Camera housing 12, directly opposite photographic lens set 13, contains a film structure 16 separated from camera interior 14 by a first shutter mechanism 18. Film structure 16 may be loaded with conventional film 19, which is protected from exposure to incoming light by first shutter mechanism 18. It will be understood by those skilled in the art that film structure 16 includes film spools upon which film 19 is loaded, a winding mechanism, and a door in camera housing 12 giving access to film 19. However, these structures are not shown since they are conventional, being used in most SLR cameras, and well-known in the art. A second film structure 20 is formed in camera housing 12 at a ninety degree angle from film structure 16 and lens structure 13. Film structure 20 is identical to film structure 16, and contains a conventional film roll 22. Film structure 20 has a winding mechanism identical to that in film structure 16, but separate so films 19 and 22 can be advanced and rewound separately. A shutter mechanism 23 separates film structure 20 from camera interior 14.

Directly opposite film structure 20, and at a ninety degree angle to film structure 16 and photographic lens set 13 is a viewfinder system 24. In this embodiment, viewfinder system 24 includes two static mirrors 25 and 26 which will reflect light from camera interior 14 onto a viewfinder lens 28. This is a conventional viewfinder system found in many reflex cameras, and while used in this embodiment, it will be understood by those skilled in the art that other viewfinder systems may be used. These other systems include a single mirror at a forty-five degree angle or a prism, which then reflects or refracts light into the photographer's eye through viewfinder lens 28.

Still referring to FIG. 1, a reflex mirror structure 30 is positioned in camera interior 14. Reflex mirror structure 30 incorporates two single-sided movable reflex mirrors 32 and 33. Single-sided movable reflex mirror 32 is a standard design feature in most SLR cameras. Reflex mirror 32 is coupled to camera housing 12 by a hinge 34 around which it pivots. Reflex mirror 32 is pivoted around hinge 34 by a spring-loaded swing arm which requires no electrical power or control circuitry. This completely mechanical device is standard on many conventional reflex cameras, and coupled to the shutter mechanism so that the position of reflex mirror 32 is changed when shutter mechanism 18 is activated. Reflex mirror 33 is coupled to camera housing 12 in camera interior 14, below reflex mirror 32 by a hinge 35. Reflex mirror 33 shares the same function and thus the same design as reflex mirror 32. It is therefore built using substantially the same design platform and materials as reflex mirror 32. Reflex mirror 32 is lowered to intercept light axis 15, therefore its upper surface 36 is coated to reflect light. Conversely, reflex mirror 33 is raised to intercept light axis 15, and therefore has its lower surface 18 coated to reflect light.

In camera 10, the film structures 16 and 20 with their shutter mechanisms 18 and 23, respectively, have been positioned in camera housing 12 at ninety degrees to each other so as to allow reflex mirrors 32 and 33 of reflex mirror structure 30 to share camera interior 14. This reduces the bulk and mass of camera 10. Since only one of reflex mirror 32 and 33 ever intercepts light axis 15 at any one time, reflex mirrors 32 and 33 are placed within camera housing 12 together, incurring only a fractional increase in the size of camera housing 12 over conventional reflex cameras. Their functions are complimentary to each other, thus reflex mirror 32 is at rest, well out of light axis 15 when reflex mirror 33 is in use.

Still referring to FIG. 1, when in operation, light enters camera 10 through photographing lens set 13 along a light axis 15. The light is reflected off of reflex mirror 32 which is slanted at a forty-five degree angle relative to the light axis 15. Light is reflected upwards from light axis 15 by reflex mirror 32, into viewfinder system 24 where it is reflected off of static mirrors 25 and 26 into the photographer's eye through viewfinder lens 28. As shutter mechanism 18 or 23 is activated, the positioning of reflex mirrors 32 and 33 of reflex mirror structure 30 are altered.

Figure 2:
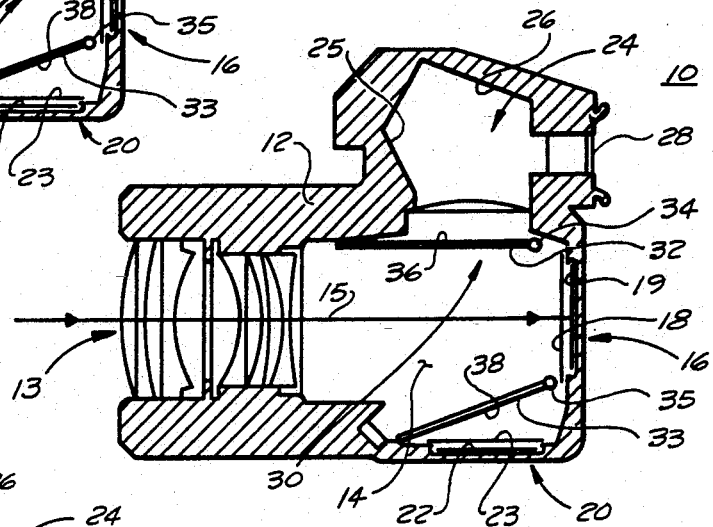
FIG. 2 is a cross-sectional side view of the embodiment shown in FIG. 1 with the reflex mirror structure positioned to allow the light access to a first shutter mechanism.

Referring to FIG. 2, when shutter mechanism 18 is activated, as a reflex action in conjunction with the activation of shutter mechanism 18, reflex mirror 32 rises upward along hinge 34 allowing light axis 15 to continue on to film structure 16. Incoming light then exposes film 19 as shutter mechanism 18 opens allowing light access. The normal position of reflex mirror 32 is that shown in diagram 1 which allows the photographer to view and focus by reflecting light upward into viewfinder system 24.

Figure 3:
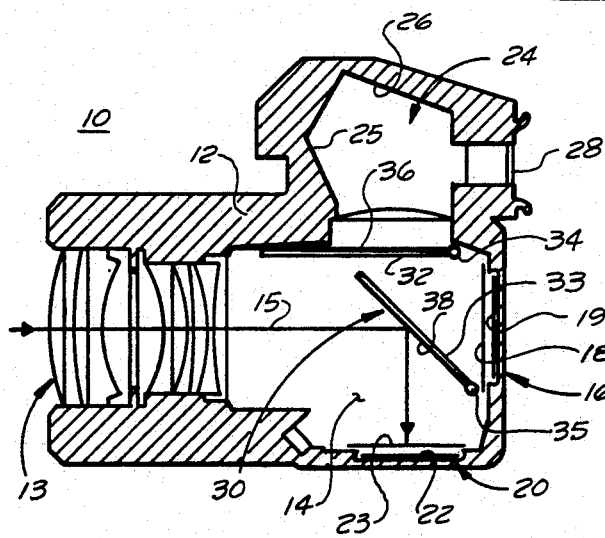
FIG. 3 is a cross-sectional side view of the embodiment illustrated in FIG. 1, as it would appear with the reflex mirror structure positioned to reflect light from the light axis to a second shutter mechanism.

Referring now to FIG. 3, when shutter mechanism 23 is activated, reflex mirror 32 pivots upward along hinge 34 removing it from light axis 15, and reflex mirror 33 pivots upward around hinge 35 placing it at a forty-five degree angle to light axis 15. This reflects light incoming through photographic lens set 13 downward to shutter mechanism 23. Thus, when shutter mechanism 23 is opened, the incoming light exposes film 22. The normal position of reflex mirror 33 is that shown in FIGS. 1 and 2, with it pivoted downward around hinge 35 removing it from light axis 15.

Figure 4:
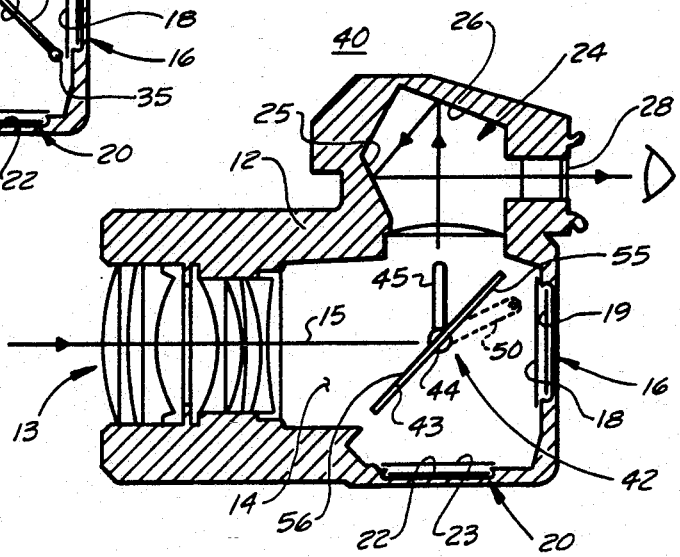
FIG. 4 is a cross-sectional side view of a second embodiment of the present invention utilizing a reflex mirror structure having one double-sided, movable reflex mirror, as it would appear with the reflex mirror structure positioned to reflect light from the light axis to the viewfinder.
Figure 10:
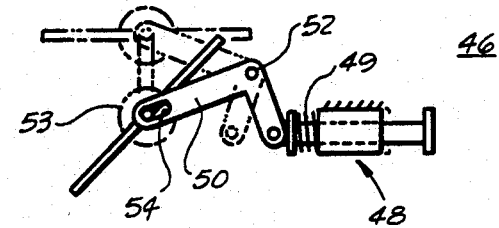
FIG. 10 is a side view of the solenoid powered push-arm.

Referring now to FIG. 4, another embodiment generally designated 40 of the present invention is illustrated. Embodiment 40 utilizes elements identical to camera 10, with the exception of reflex mirror structure 30. In this embodiment, a reflex mirror structure 42 consists of a single, double-sided articulated reflex mirror 43. In this embodiment, reflex mirror 43 swivels along a central axis 44, as well as moves up and down vertically along slot 45 in camera housing 12. A solenoid powered push arm 46 couples reflex mirror 43 to camera housing 12 inside camera interior 14, and alters its position with respect to light axis 15. Solenoid powered push arm 46, as shown in FIG. 10, consists of a piston 48 with an energizing coil 49 coupled thereto. When coil 49 expands, piston 48 is extended, pushing an L-shaped arm 50 hingedly coupled thereto. The end of L-shaped arm 50, opposite piston 48, is coupled to a central axis 44 of reflex mirror 43. L-shaped arm 50 pivots on an axis 52 resulting in central axis 44 of reflex mirror 43 to raise vertically upward along slot 45. Still referring to FIG. 10, an axis guide hole 54 is formed in the end of L-shaped arm 50 opposite the end coupled to piston 48. A rotary solenoid 53 is coupled to L-shaped arm 50 at the same end as axis guide hole 54. Rotary solenoid 53 controls the angle of reflex mirror 43. Guide hole 54 allows reflex mirror 43 to rise and descent vertically, overcoming the arch motion of the L-shaped arm 50.

Referring back to FIG. 4, the normal position of reflex mirror 43 is illustrated. Reflex mirror 43 interrupts light axis 15 and reflects light vertically upward into viewfinder system 24, allowing viewing and focusing. In this position, reflex mirror 43 is at a forty-five degree angle, with an upper reflective surface 56 intercepting light axis 15.

Figure 5:
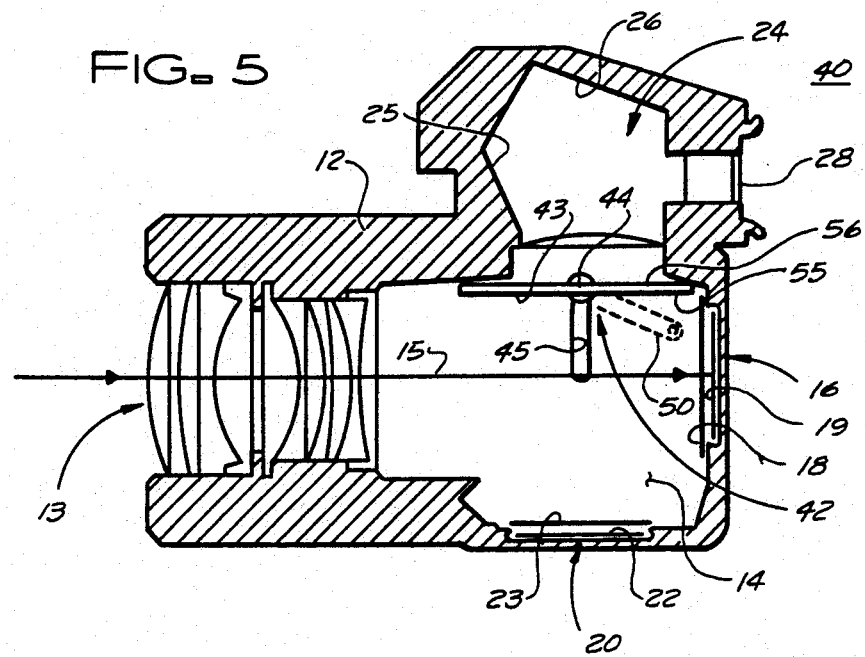
FIG. 5 is a cross-sectional side view of the second embodiment of the present invention illustrated in FIG. 4, as it would appear with reflex mirror structure positioned to allow light access to a first shutter mechanism.

As shutter mechanism 18 is activated, solenoid powered 13 push arm 46 is activated, pushing L-shaped arm 50, causing it to rotate on axis 52. This results in central axis 44 of reflex mirror 43 rising upward vertically along slot 45 out of light axis 15. As reflex mirror 43 rises vertically along slot 45, rotary solenoid 53 turns reflex mirror 43 backwards forty-five degrees so it is horizontal to light axis 15. As illustrated in FIG. 5, this permits light entering photographic lens set 13 to continue uninterrupted along light axis 15 to shutter mechanism 18. When shutter mechanism 18 opens, film 19 is exposed.

Figure 6:
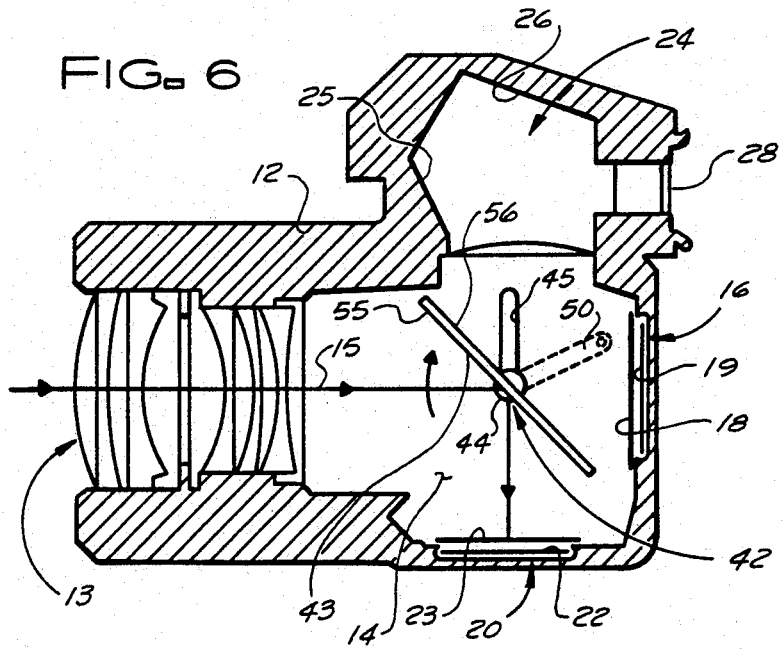
FIG. 6 is a cross-sectional side view of the second embodiment illustrated in FIG. 4, as it would appear with the reflex mirror structure positioned to reflect light from the light axis to a second shutter mechanism.

Referring now to FIG. 6, when shutter mechanism 23 is activated, reflex mirror 43 shifts from its position illustrated in FIG. 4 to a position which interrupts light axis 15 at a forty-five degree angle downward reflecting light downward to shutter mechanism 23 which, when opened, will expose film 22. In this position, piston solenoid 48 is not activated, keeping reflex mirror 43 in light axis 15. Rotary solenoid 53, however, is activated causing reflex mirror 43 to swivel backwards ninety degrees around central axis 44. A lower reflective surface 55 of reflex mirror 43 intercepts light axis 15 at a forty-five degree angle.

A further embodiment of generally designated 60 of the present invention is illustrated in FIGS. 11 through 13. In embodiment 60, a camera housing 62 allows light access to camera interior 64 through a photographic lens set 63. Photographic lens set 63 is formed in one side of camera housing 62, and consists of conventional photographic lenses. Light entering lens set 63 extends along a light axis 65. Directly opposite lens set 63 along light axis 65 is a viewfinder lens 66 set in camera housing 62. A film structure 68 is formed in camera housing 62 at a ninety degree angle with respect to light axis 65. Film structure 68 includes a wind-up mechanism so that film 69 can be advanced and rewound, and a door formed in camera housing 62 giving access to film 69. Film structure 68 is not illustrated in detail since this structure is well-known to those skilled in the art and used in most conventional cameras. A shutter mechanism 70 separates film structure 68 from camera interior 64, preventing exposure of film 19.

A film structure 72 identical to film structure 68 is formed in camera housing 62 at a ninety degree angle with respect to light axis 65, directly opposite film structure 68. Film structure 72 is completely independent from film structure 68, allowing a film 73 to be exchanged independently of film 69. A shutter mechanism 74 separates film structure 72 from camera interior 64, preventing film 73 from being exposed. Embodiment 60 utilizes a reflex mirror structure 75 which is substantially identical to reflex mirror structure 42 of embodiment 40. However, in embodiment 60, one single-sided articulated reflex mirror 76 is used, having a reflective surface 77. It is coupled in camera interior 64 by a solenoid powered push arm 78 which is substantially identical to the solenoid powered push arm 47 of embodiment 40. The difference between solenoid powered push arm 78 and solenoid powered push arm 47 is that push arm 78 uses a rotary solenoid 79 which rotates reflex mirror 76 around an axis 80 through two hundred-twenty five degrees as opposed to ninety degrees in embodiment 40. It will be understood by those skilled in the art, that reflex mirror structure 42 of embodiment 40 may be used in embodiment 60, requiring only ninety degrees rotation, and that reflex mirror structure 75 may be used in embodiment 40, requiring ninety degrees rotation.

Still referring to FIG. 7, reflex mirror structure 75 is illustrated in its horizontal raised position. This is the normal position for reflex mirror 76, allowing light entering photographic lens set 63 along light axis 65 to travel uninterrupted to viewfinder lens 66.

FIG. 8 illustrates the position of reflex mirror structure 75 after shutter mechanism 70 has been activated. Reflex mirror 76 is lowered and swivels so that reflective surface 77 is at a forty-five degree angle with respect to light axis 65, by a solenoid powered push arm 78 and rotary solenoid 79, respectively. In this position, reflex mirror 76 intercepts the incoming light along light axis 65, reflecting it vertically upward towards shutter mechanism 70. When shutter mechanism 70 is opened, film 69 is exposed. Reflex mirror structure 75 then reverts back to its initial position illustrated in FIG. 7.

FIG. 9 illustrates the position of reflex mirror structure 75 when shutter mechanism 74 is activated. Reflex mirror 76 is lowered and swivels through ninety degrees, stopping with reflective surface 77 at a forty-five degree angle downward with respect to light axis 65. In this position, light is reflected downward towards shutter mechanism 74 which, when open, allows the incoming light to expose film 73.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A single lens reflex camera comprising:
   a camera housing having a camera interior;
   a photographic lens set extending through one side of said camera housing, to admit light into said camera interior along a light axis;
   a viewfinder system, a first film structure, and a second film structure, each coupled to said camera housing in a spaced apart relationship, and extending into said camera interior;

a first shutter mechanism isolating said first film structure from said camera interior;

a second shutter mechanism isolating said second film structure from said camera interior;

a double sided reflex mirror; and a piston solenoid with energizing coil carried within camera housing, an L-shaped arm hingedly coupled to said piston solenoid, and a rotary solenoid coupling said reflex mirror to said L-shaped arm for positioning said reflex mirror to direct said incoming light to said viewfinder system in a rest position and to said first film structure when said first shutter mechanism is activated and to said second film structure when said second shutter mechanism is activated.

2. A single lens reflex camera comprising:

a camera housing having a camera interior;

a photographic lens set extending through one side of said camera housing, to admit light into said camera interior along a light axis;

a viewfinder system coupled to said camera housing at a ninety degree angle to said light axis, and extending into said camera interior;

a first film structure coupled to said camera housing along said light axis at a ninety degree angle to said viewfinder system, and extending into said camera interior;

a second film structure coupled to said camera housing at a ninety degree angle to said light axis, opposite said viewfinder system and extending into said camera interior;

a first shutter mechanism isolating said first film structure from said camera interior;

a second shutter mechanism isolating said second film structure from said camera interior;

a double sided reflex mirror; and a piston solenoid with energizing coil carried within camera housing, an L-shaped arm hingedly coupled to said piston solenoid, and a rotary solenoid coupling said reflex mirror to said L-shaped arm for positioning said reflex mirror to direct said incoming light to said viewfinder system in a rest position and to said first film structure when said first shutter mechanism is activated and to said second film structure when said second shutter mechanism is activated.

* * * * *